UNITED STATES PATENT OFFICE.

ERNST MARMETSCHKE, OF SCHÖPFURTH, NEAR EBERSWALDE, GERMANY, ASSIGNOR TO HEINRICH BRÜNING, OF SCHÖPFURTH, NEAR EBERSWALDE, GERMANY.

METHOD OF IMPREGNATING TIMBER AND THE LIKE.

No. 898,246.      Specification of Letters Patent.      Patented Sept. 8, 1908.

Application filed May 8, 1907. Serial No. 372,589.

*To all whom it may concern:*

Be it known that I, ERNST MARMETSCHKE, a citizen of the Empire of Germany, residing at Schöpfurth, near Eberswalde, Kingdom of Prussia, in the Empire of Germany, have invented a new and useful Method of Impregnating Timber and the Like, of which the following is a specification.

This invention relates to a known process of impregnating wood and the like under hydraulic pressure with a mixture of heavy metal salts and aluminium compounds, such as chlorid of zinc or sulfate of copper and sulfate or acetate of alumina. Hitherto in such processes it has been proposed to use a solution of sulfate of iron, common or rock salt, common alum and water which is gradually heated to from 80° to 120° C. In another process it has been proposed to use a solution containing double sulfate of ammonium with iron, zinc, copper and the like which is first heated to about 60° or 70° C. then introduced into a pressure vessel and subsequently heated to 98° C.

I have found that a temperature of 100° C. or more is neither necessary, nor useful, for such temperatures result in the destruction of the mechanical strength of the timber by dissolving the fibers of the wood. Further, with such high temperatures, free mineral acid is formed which also destroys the fiber of the wood unless a neutralizing agent is added to the impregnating solution.

The present invention consists in the application to the impregnating solution, of means for preventing lixiviation or leaching as for example by the addition of an alumina compound; then heating the solution to a sufficiently high temperature to produce coagulation of the albumen of the wood, but not sufficient to set up the formation of free acid.

The present invention obviates the difficulties of the former processes and results in wood completely saturated with the solution of heavy metal salts and aluminium compounds, using hydraulic pressure, this result being obtained without substantially affecting the strength of the wood and without forming more than traces of free mineral acid. To effect this the wood is steeped in the impregnating solution above mentioned under pressure and at a temperature between 60° C. and 98° C.

The albumen of the wood is coagulated at the minimum temperature mentioned above, this coagulation being essential to the combination of the impregnating substance with the woody fiber which results in a compound insoluble in water and having an antiseptic effect, that is the insoluble combination of the solution and fiber sought for is formed at a temperature much less than that supposed to be effective heretofore, with the result that the maximum temperature used by me is below that at which decomposition of the wood fiber will take place, as there is no excessive boiling and no formation of free acid.

In the present invention the albumen of the wood is coagulated by relatively low temperatures;—about 65° C—, the wood fiber can combine with more of the impregnating substances than when using higher temperatures, and at the same time the formation of free acid is avoided.

By trials of the applicant and of the Koenigliches Material Prüfüngsamt Grosslichterfelds near Berlin it has been proved that wood treated by a solution at the temperatures stated was completely saturated with the impregnating salts while at the same time the formation of the injurious free acid was reduced to a minimum.

In carrying out the invention the wood to be treated is stripped wholly or partially of its bark and then placed in the impregnation vessels composed of iron or the like, after which the vessels are closed hermetically and the air exhausted from them. The impregnation solution under hydraulic pressure is introduced in the vessels composed as above described of heavy metal salts with the addition of aluminium sulfate, the wood being wholly immersed in the solution, the temperature ranging from 60° to 98° C. It has been found that three hours is usually sufficient for complete impregnation.

The novelty of my invention consists in that the wood is treated with a mixture of salts of heavy metals and salts of aluminium in a solution under hydraulic pressure of about 8 to 12 kilograms per cubic centimeter and at a temperature between 60° and 98° C. During the heating of the wood in the solution combinations of heavy metals and aluminium are formed in the wood, which are insoluble in water and cause the protecting effect against decay and fire.

What I claim is:

The process of preserving wood which consists in impregnating timber and the like under hydraulic pressure with a solution of salts of heavy metals with the addition of an aluminium salt consisting in carrying on the impregnation at a temperature ranging between 60° and 98° C. substantially as described.

ERNST MARMETSCHKE.

Witnesses:
 HENRY HASPER,
 WOLDEMAR HAUPT.